United States Patent
Cheng et al.

(10) Patent No.: US 10,061,400 B2
(45) Date of Patent: Aug. 28, 2018

(54) INPUT DEVICE AND CONTROL SYSTEM

(71) Applicant: TENCENT TECHNOLOGY (SHENZHEN) COMPANY LIMITED, Shenzhen (CN)

(72) Inventors: Shihai Cheng, Shenzhen (CN); Anqi Ren, Shenzhen (CN); Qing He, Shenzhen (CN); Chenglin Liu, Shenzhen (CN); Jinhai Liu, Shenzhen (CN); Xiangyao Lin, Shenzhen (CN); Kai Liu, Shenzhen (CN); Bin Huang, Shenzhen (CN); Liangliang Fan, Shenzhen (CN); Yaobo Hua, Shenzhen (CN); Yaxuan Zhu, Shenzhen (CN); Yu Li, Shenzhen (CN); Huihui Chen, Shenzhen (CN); Leteng Weng, Shenzhen (CN); Zhan Shu, Shenzhen (CN); Nongfei Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/354,906

(22) Filed: Nov. 17, 2016

(65) Prior Publication Data
US 2017/0068332 A1    Mar. 9, 2017

Related U.S. Application Data

(63) Continuation of application No. PCT/CN2015/082693, filed on Jun. 29, 2015.

(30) Foreign Application Priority Data

Jun. 30, 2014    (CN) .......................... 2014 1 0309613

(51) Int. Cl.
G06F 3/03    (2006.01)
G06F 3/0338    (2013.01)
(Continued)

(52) U.S. Cl.
CPC .......... *G06F 3/0338* (2013.01); *G06F 3/0346* (2013.01); *G06F 3/0362* (2013.01);
(Continued)

(58) Field of Classification Search
CPC .... G06F 3/0338; G06F 3/0383; G06F 3/0362; G06F 3/0346; G06F 3/03547; G06F 3/02
See application file for complete search history.

(56) References Cited

U.S. PATENT DOCUMENTS 5,589,828 A * 12/1996 Armstrong ......... G05G 9/04737
200/6 A
6,088,022 A    7/2000 Rakoski
(Continued)

FOREIGN PATENT DOCUMENTS

CN    104142823 A    11/2014
JP    H10207624 A    8/1998
(Continued)

OTHER PUBLICATIONS

The World Intellectual Property Organization (WIPO) International Search Report for PCT/CN2015/082693 dated Sep.18, 2015 pp. 1-3.
(Continued)

*Primary Examiner* — Liliana Cerullo
(74) *Attorney, Agent, or Firm* — Anova Law Group, PLLC

(57) ABSTRACT

An input device includes an input module and a fixing module matching the input module. The input module is a sphere having a cavity, the input module includes a signal detection unit and a signal output unit, the signal detection unit and the signal output unit are placed in the cavity after
(Continued)

being electrically connected, the signal detection unit is configured to generate a corresponding input signal according to a preset operation performed by a user on the input module, and the signal output unit is connected to an external terminal and configured to output the input signal to the terminal. The fixing module is configured to fix the input device on a preset flat surface.

14 Claims, 8 Drawing Sheets

(51) Int. Cl.
    *G06F 3/0354*     (2013.01)
    *G06F 3/0346*     (2013.01)
    *G06F 3/0362*     (2013.01)
    *G06F 3/038*     (2013.01)
    *G06F 3/02*     (2006.01)

(52) U.S. Cl.
    CPC ........ *G06F 3/0383* (2013.01); *G06F 3/03547* (2013.01); *G06F 3/02* (2013.01); *G06F 2203/0384* (2013.01)

(56) References Cited

U.S. PATENT DOCUMENTS

| | | | | |
|---|---|---|---|---|
| 6,417,837 | B1* | 7/2002 | Baba | G06F 3/03543 345/157 |
| 2002/0140745 | A1* | 10/2002 | Ellenby | G01C 21/20 715/848 |
| 2007/0247439 | A1* | 10/2007 | Daniel | G06F 1/1601 345/173 |
| 2010/0265176 | A1* | 10/2010 | Olsson | G05G 5/05 345/161 |
| 2015/0088280 | A1* | 3/2015 | Micewicz | G06F 3/0346 700/61 |

FOREIGN PATENT DOCUMENTS

| | | |
|---|---|---|
| JP | 2005267174 A | 9/2005 |
| WO | 0063874 A | 10/2000 |

OTHER PUBLICATIONS

The State Intellectual Property Office of the People's Republic of China (SIPO) Office Action 1 for 201410309613.3 dated Aug. 4, 2016 pp. 1-10.

* cited by examiner

INPUT DEVICE AND CONTROL SYSTEM

CROSS REFERENCE

This application claims priority to PCT Application No. PCT/CN2015/082693, filed on Jun. 29, 2015, which claim priority to Chinese Patent Application No. 2014103096133, filed on Jun. 30, 2014. The content of the two priority applications is hereby incorporated by reference in their entirety.

FIELD OF THE TECHNOLOGY

The present disclosure relates to the field of Internet technologies, in particular, to the field of information transmission technologies, and specifically, to an input device and a control system.

BACKGROUND OF THE DISCLOSURE

With the development of terminals and related applications thereof, people may accomplish various tasks in work, study, and entertainment by using terminals in combination with a related application. On a desktop, as traditional input devices, a mouse and a keyboard have good usability. However, with the development of the mobile Internet, users have an increasingly high requirement for mobile office or entertainment. In this case, it is inconvenient to carry the mouse and keyboard. On a mobile device, generally, a touchscreen or physical button of a terminal is used to complete various inputs and operations. However, the touchscreen or the physical button is small and therefore input may be inconvenient, and moreover, when the touchscreen is used for input, because an input manner is limited to touch, even if different gesture operations are defined to correspond to different inputs, the number of gesture operations is still very limited because of a limitation to the input manner. Moreover, input efficiency and user experience are poor. Especially in the case of an entertainment application, these defects are very obvious.

Under the trend of the increasingly higher requirement for mobile office and entertainment, a traditional information input device cannot satisfy the actual requirement of a user for convenient and efficient input because of a limitation to an operation mode. How to improve convenience of input becomes a technical problem that urgently needs to be solved.

SUMMARY

A first aspect of the present disclosure provides an input device, which may include: an input module and a fixing module matching the input module, the input module being a sphere having a cavity, the input module including a signal detection unit and a signal output unit, the signal detection unit and the signal output unit being placed in the cavity after being electrically connected, the signal detection unit being configured to generate a corresponding input signal according to a preset operation performed by a user on the input module, and the signal output unit being connected to an external terminal and configured to output the input signal to the terminal; and the fixing module being configured to fix the input device on a preset flat surface.

A second aspect of the present disclosure provides a control system, which may include: the input device according to the first aspect of the present disclosure; and a terminal, configured to receive an input signal sent by the input device, and control, according to the input signal, an action of an object to which the input device is currently mapped.

BRIEF DESCRIPTION OF THE DRAWINGS

To illustrate the technical solutions in the embodiments of the present disclosure or the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the embodiments of the present disclosure, an input device may be fixed on a preset flat surface, and the preset flat surface may be a desk surface, ground surface, or the like in parallel with the horizontal flat surface, may also be a vertical wall surface in parallel with a plumb line, and may also be a flat surface that forms an angle with the horizontal flat surface, and may even be fixed on a left palm surface of a user, where various input operations are performed by using the right hand, as long as it is ensured that an input signal is transmitted to a terminal exactly. The terminal herein may include intelligent devices such as a personal computer (PC), a tablet computer, a mobile phone, a personal digital assistant (PDA), an e-reader, a notebook computer, and an in-vehicle terminal. The input device may be connected to the terminal by using a wired connecting interface such as a universal serial bus (USB), and may also communicate with the terminal by using a wireless connecting module such as a Bluetooth module, a wireless fidelity (WiFi) module, or a Zegbee module. Similar to other input devices such as a computer mouse or a touch screen, the input device of the present disclosure may be made of plastic parts, metal parts, or parts of other suitable materials that enable the implementation of the input functions described herein.

The input device provided by the embodiments of the present disclosure is described in detail below with reference to FIG. 1 to FIG. 4.

Figure 1:
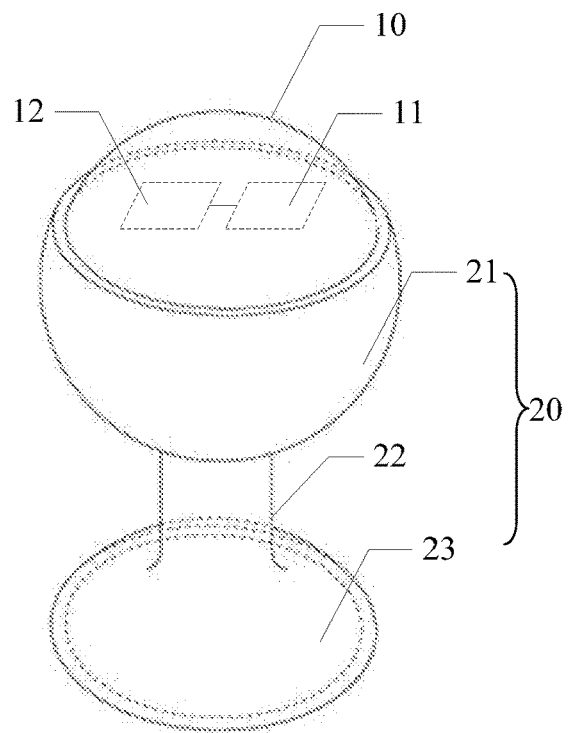
FIG. 1 is a schematic diagram of an input device according to an embodiment of the present disclosure.

Refer to FIG. 1, which is a schematic diagram of an input device according to an embodiment of the present disclosure. The input device may include: an input module 10 and a fixing module 20 matching the input module 10, where the input module 10 is a sphere having a cavity, the input module 10 includes a signal detection unit 11 and a signal output unit 12, the signal detection unit 11 and the signal output unit 12 are placed in the cavity after being electrically connected, the signal detection unit 11 is configured to generate a corresponding input signal according to a preset operation performed by a user on the input module 10, and the signal output unit 12 is connected to an external terminal and configured to output the input signal to the terminal; and the fixing module 20 is configured to fix the input device on a preset flat surface.

Specifically, the fixing module 20 may include an accommodating portion 21, a connecting portion 22, and a fixing portion 23, where the accommodating portion 21 is in the shape of a cup, and configured to accommodate the input module 10, and the input module 10 may roll in the accommodating portion 21; the connecting portion 22 is separately connected to the accommodating portion 21 and the fixing portion 23; and the fixing portion 23 is in the shape of a suction cup. The entire input device is fixed by means of absorbability of the suction cup.

Optionally, a rim diameter of the accommodating portion 21 is less than a diameter of the input module 10. In this way, when the user operates the input module 10, the input module 10 can be prevented from rolling out of the accommodating portion 21, thereby protecting the spherical input module 10 well.

It should be noted that, the accommodating portion 21 may also be in another shape, for example, a cube having an opening on one end, where a length of a side thereof is greater than the diameter of the input module 10. In this way, the input module 10 can also roll in the accommodating portion 21. However, as compared with the cup-like accommodating portion 21, the volume of the cubic accommodating portion is larger, and there is a risk that the input module 10 may get out of the accommodating portion 21.

Optionally, the input module 10 and the connecting portion 22 are made of an elastic material. Therefore, the connecting portion 22 may be bent to any direction by using the suction cup center of the fixing portion 23 as a base point. In this way, it is ensured that a squeezing or twisting operation can be performed by the user on the input module 10 or the connecting portion 22. This operation manner is very innovative, and can achieve good input efficiency in combination with a corresponding application, and the operation is very convenient. For example, after the input device is connected to the terminal, if it is required to control a mapped object in an application of the terminal to rotate, it may be performed by twisting the input module 10 or the connecting portion 22; and when it is required to perform control to decrease the volume of the mapped object in the application of the terminal, it may be performed by squeezing the input module 10.

Certainly, in a feasible implementation manner, the input module 10 may also be disposed independently and work independently, which can be used as long as the input module 10 is mapped to a mapped object in an application of the terminal and a direction of the input module 10 is aligned to a direction of the mapped object in the application of the terminal, for example, the input module 10 may be directly placed on any flat surface or curved surface or a flat surface with at least two lines of bumps, and the any flat surface or curved surface or the flat surface with at least two lines of bumps is used for fixing in place of the fixing module 20.

Corresponding to the input device according to this embodiment of the present disclosure, the preset operation performed by the user may include any one or more of the following: rolling the input module 10 at a first speed in any direction, or bending the connecting portion 22 at a first speed in any direction; rolling the input module 10 at a second speed in any direction, or bending the connecting portion 22 at a second speed in any direction; flipping the input module 10 in any direction, so as to make a speed of the input module 10 reach the second speed, or bending the connecting portion 22 in any direction and then releasing the input module 10, so as to make a speed of the input module 10 reach the second speed; twisting the input module 10 in any direction; and squeezing the input module 10.

The user may bend the connecting portion 22 by stroking the accommodating portion 21 or stroking the input module 10, or even directly bending the connecting portion 22.

It should be noted that, the second speed is greater than the first speed, and specific values may be preset by a vendor, or defined by the user according to an operation habit thereof. Moreover, the foregoing preset operations may be performed separately, or two or more of the preset operations may be performed simultaneously, for example, when the input device is connected to the terminal, and controls the mapped object in the application of the terminal by using the input signal, the input module 10 may be twisted and squeezed simultaneously; and correspondingly, the volume of the mapped object may be controlled to decrease and meanwhile, the mapped object may be controlled to turn around or rotate. Moreover, there is a mapping relationship between the foregoing preset operation and an action of the mapped object in the application of the terminal. This mapping relationship may be preset by the vendor or defined by the user, which is not limited herein.

Optionally, the signal detection unit 11 may include multiple types of sensors, configured to sense operations performed by the user and generate corresponding input signals.

For example, the signal detection unit may include an acceleration sensor and a gyro sensor. The acceleration sensor is configured to sense a linear acceleration of the input module 10 when the user performs the preset operation on the input module 10, and the signal output unit 12 is configured to output the linear acceleration of the input module 10 to the terminal, so that the terminal controls an acceleration of a mapped object in an application of the terminal according to the linear acceleration of the input module 10; and the gyro sensor is configured to sense an angular velocity of the input module 10 when the user performs the preset operation on the input module 10, and the signal output unit 12 is further configured to output the angular velocity of the input module 10 to the terminal, so that the terminal controls an angular velocity of the mapped object in the application of the terminal according to the linear acceleration of the input module 10.

The acceleration sensor may be a piezoelectric acceleration sensor, which is also referred to as a piezoelectric accelerometer. The piezoelectric acceleration sensor is an inertial sensor. The principle of the piezoelectric acceleration sensor is that a piezoelectric effect of a piezoelectric ceramic or a quartz crystal is applied, and when the accelerometer is vibrated, a force that a mass imposes on a piezoelectric element changes accordingly. When a measured vibration frequency is far less than a natural frequency of the accelerometer, a force change is in direct proportion to a measured acceleration.

The acceleration sensor may also be a piezoresistive acceleration sensor, which has features such as a small size and low power consumption, is easily integrated into various analog and digital circuits, and is widely used in fields such as a vehicle crash test, an instrument test, equipment vibration monitoring.

In a preferred implementation manner, the acceleration sensor may also be a capacitive acceleration sensor, which is a variable-polar-distance capacitive sensor based on the capacitive principle. The capacitive acceleration sensor/capacitive accelerometer is a general acceleration sensor, and is irreplaceable in some fields, such as a safety airbag and a mobile terminal such as a mobile phone. A micro-electro-mechanical system technology is used for the capacitive acceleration sensor/capacitive accelerometer, so that production in large quantity becomes economical, thereby ensuring a relatively low cost.

Optionally, the acceleration sensor herein is a tri-axis acceleration sensor, and the gyro sensor is a tri-axis gyro sensor. The acceleration sensor and the gyro sensor may form an inertial measurement unit (IMU) and the IMU is an apparatus for measuring a tri-axis attitude angle (or angular rate) and acceleration of an object. Generally, one IMU includes three single-axis accelerometers and three single-axis gyros. The accelerometers detect acceleration signals of an object in three independent axes in a coordinate system of a carrier, and the gyros detect signals of angular velocities of the carrier relative to a navigation coordinate system to measure an angular velocity and acceleration of the object in three-dimensional space, thereby calculating an attitude of the object accordingly. In this embodiment, by using the acceleration sensor and the gyro sensor, an offset direction and angle of a motion of the input device under the operation of the user can be obtained.

As main elements of the IMU, precision of the gyro sensor and the acceleration sensor directly affects precision of an inertial system. In actual work, various unavoidable interference factors lead to errors of the gyro and the accelerometer. From initial alignment, navigation errors thereof, especially, position errors, grow as time passes, which is the main disadvantage of the inertial system. Therefore, it is necessary to use external information to help implement integrated navigation, so that a problem that errors accumulate as time passes is reduced effectively. To improve reliability, more sensors may further be configured for each axis. Generally, an IMU needs to be installed on the center of gravity of a measured object. Correspondingly, in this embodiment, the IMU is installed on the center of gravity of the input device.

Optionally, the signal detection unit 11 may further include an electronic compass sensor, where the electronic compass sensor may be configured to determine a position and direction of the input module according to earth induction, and the signal output unit 12 is further configured to output the position and direction of the input module 10 to the terminal, so that the terminal determines a position and direction of the mapped object in the application of the terminal according to the position and direction of the input module 10. During mapping to the mapped object in the application of the terminal, by using geomagnetic data of the electronic compass sensor in the input device in combination with geomagnetic data of the terminal, a direction and orientation, of the input device, mapped onto a display interface of the terminal can be obtained, thereby implementing direction alignment.

Optionally, the signal detection unit 11 may further include a barometric pressure detection sensor. The barometric pressure detection sensor may be disposed in the cavity of the input module 10, and a sealed independent space may also be disposed in the cavity of the input module 10 to accommodate the barometric pressure detection sensor. When the user squeezes the input module 10, the barometric pressure detection sensor may be configured to generate a corresponding squeezing signal by sensing a barometric change in the input module 10. The signal output unit 12 is further configured to output the squeezing signal to the terminal, so that the terminal performs control to decrease the volume of the mapped object in the application of the terminal.

Figure 2:
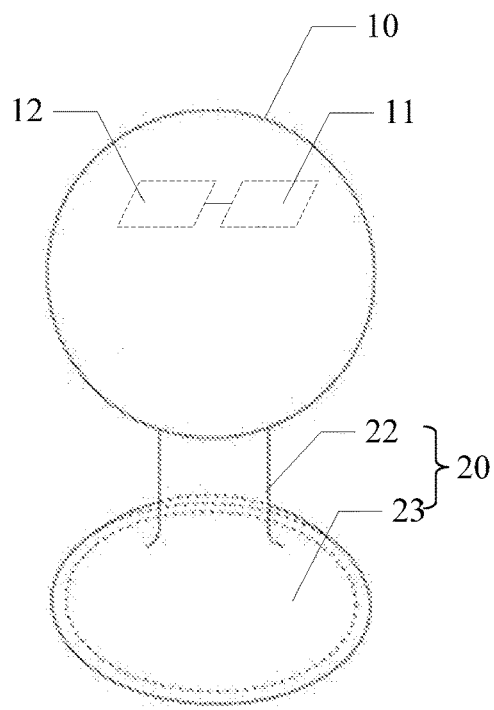
FIG. 2 is a schematic diagram of another input device according to an embodiment of the present disclosure.

Refer to FIG. 2, which is a schematic diagram of another input device according to an embodiment of the present disclosure. In this embodiment, the input device includes: an input module 10 and a fixing module 20 matching the input module 10, where the input module 10 is a sphere having a cavity, the input module 10 includes a signal detection unit 11 and a signal output unit 12, the signal detection unit 11 and the signal output unit 12 are placed in the cavity after being electrically connected, the signal detection unit 11 is configured to generate a corresponding input signal according to a preset operation performed by a user on the input module 10, and the signal output unit 12 is connected to an external terminal and configured to output the input signal to the terminal; and the fixing module 20 is configured to fix the input device on a preset flat surface.

Different from the input device shown in FIG. 1, in this embodiment, the fixing module 20 includes a connecting portion 22 and a fixing portion 23. The connecting portion 22 is separately connected to the input module 10 and the fixing portion 23. The fixing portion 23 is in the shape of a suction cup.

That is, in FIG. 1, the input module 10 is not connected to the fixing module 20, and the input module 10 can roll in the cup-like accommodating portion 21 of the fixing module 20 shown in FIG. 1. However, in this embodiment, the input module 10 is connected to the connecting portion 22, and the connecting portion 22 is then connected to the fixing portion 23, thereby forming a unibody input device, which has a stable structure and is not easily damaged. The input module 10 and the connecting portion 22 are made of an elastic material. Therefore, the connecting portion 22 may be bent to any direction by using the suction cup center of the fixing portion 23 as a base point.

The user can also perform any one or more of the following preset operations on the input device according to this embodiment: rolling the input module 10 at a first speed in any direction, or bending the connecting portion 22 at a first speed in any direction; rolling the input module 10 at a second speed in any direction, or bending the connecting portion 22 at a second speed in any direction; flipping the input module 10 in any direction, so as to make a speed of the input module 10 reach the second speed, or bending the connecting portion 22 in any direction and then releasing the input module 10, so as to make a speed of the input module 10 reach the second speed; twisting the input module 10 in any direction; and squeezing the input module 10.

Optionally, the signal detection unit 11 may include an acceleration sensor and a gyro sensor, and may further include an electronic compass sensor and a barometric pressure detection sensor.

By using these sensors, a corresponding input signal may be generated according to the preset operation performed by the user on the input module 10, and is output to the external terminal by using the signal output unit 12. Functions of the sensors and a process of generating a signal by sensing a user operation have been described in detail in the embodiment shown in FIG. 1, which are not described herein again.

Figure 3:
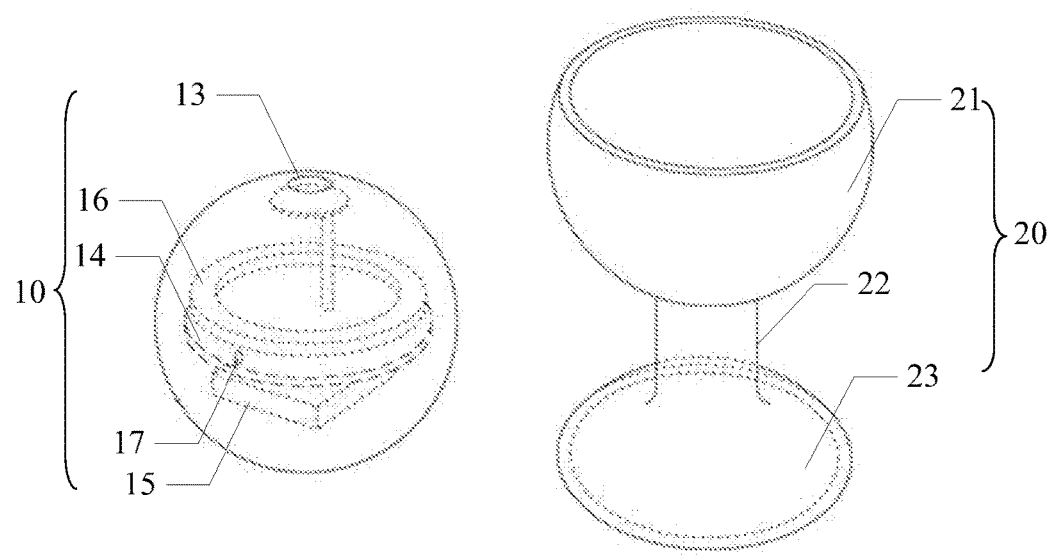
FIG. 3 is a schematic decomposition diagram of still another input device according to an embodiment of the present disclosure.

Refer to FIG. 3, which is a schematic diagram of still another input device according to an embodiment of the present disclosure. In this embodiment, the input device has a same structure as the input device shown in FIG. 1, that is, an input module 10 and a fixing module 20 are separately disposed independently, and the input module 10 may be accommodated in an accommodating portion 21 of the fixing module 20. For ease of view and description, the input module 10 and the fixing module 20 are decomposed, and a signal detection unit 11 and a signal output unit 12 are integrated on a circuit board 14, and therefore are not separately shown in FIG. 3.

In this embodiment, the input module 10 is a sphere having a cavity and the input module 10 includes a signal detection unit 11 (not shown in the figure) and a signal output unit 12 (not shown in the figure), where the signal detection unit 11 and the signal output unit 12 are placed in the cavity after being electrically connected, the signal detection unit 11 is configured to generate a corresponding input signal according to a preset operation performed by a user on the input module 10, and the signal output unit 12 is connected to an external terminal and configured to output the input signal to the terminal.

The fixing module 20 is configured to fix the input device on a preset flat surface.

The fixing module 20 includes an accommodating portion 21, a connecting portion 22, and a fixing portion 23, where the accommodating portion 21 is in the shape of a cup, and configured to accommodate the input module 10; the connecting portion 22 is separately connected to the accommodating portion 21 and the fixing portion 23; and the fixing portion 23 is in the shape of a suction cup.

The input module 10 and the connecting portion 22 are made of an elastic material.

The signal detection unit 11 includes an acceleration sensor and a gyro sensor, and may further include an electronic compass sensor and a barometric pressure detection sensor.

Optionally, a data transmission interface is further disposed on the fixing module 20, and the signal output unit 12 is connected to the terminal in a wired manner by using the data transmission interface. For example, the data transmission interface may be a USB interface or another interface having a signal transmission capability. The data transmission interface may be specifically disposed on the connecting portion 22 of the fixing module 20.

In a preferable implementation manner, the signal output unit 12 may include a wireless transmission subunit, and the signal output unit 12 is connected to the terminal in a wireless manner. The wireless transmission subunit may transmit a signal by using a Bluetooth technology, a WiFi technology, or a Zegbee technology. In the wireless transmission manner, hardware reconstruction of an input device can be reduced, which is conducive to stability of an entire structure, and also convenient for the user to carry and use the input device, no additional connection cable such as a data line needs to be carried, and only pairing for a wireless connection is required.

Optionally, the input module 10 further includes a button 13, where the button 13 is electrically connected to the signal detection module, and the button 13 is disposed on the surface of the sphere of the input module 10 and is not in contact with the fixing module 20.

The button 13 may be a physical button 13 or a capacitive button 13.

A function of the button 13 may be preset by a vendor or defined by the user, which is not limited herein. In combination with different applications of the terminal, the button 13 can implement various functions, for example, the button may be used as a confirm key, or may trigger a preset action of a mapped object in an application of the terminal. Certainly, the button 13 may also be combined with the foregoing preset operation, so as to obtain more operation actions, for example, when the input module 10 is rolled in a direction, correspondingly, the mapped object in the application of the terminal is controlled to move in a direction; and when the button 13 is pressed, the mapped object may be triggered to leap. Therefore, when the button 13 is pressed and the input module 10 is rolled simultaneously, the mapped object may be controlled to leap in a corresponding direction.

Optionally, the input module 10 may further include the circuit board 14, where the circuit board 14 is placed in the cavity of the input module 10, and the signal detection module and the signal output module are placed on the circuit board 14. Various elements may be configured on the circuit board 14 to acquire, process, and output a signal.

Optionally, the input device further includes a battery 15, a charging interface is further disposed on the fixing module 20, and the battery 15 is placed in the cavity of the input module 10 and is electrically connected to the charging interface by using the circuit board 14.

The charging interface and the data transmission interface may be configured in a multiplexing manner, and may also be configured separately, thereby charging the input device.

Certainly, besides that the input device supplies power, when the input device is used, the terminal may also supply power to the input device by connecting the input device and the terminal by using a charging cable directly.

In a preferable implementation manner, the input device may include a battery 15 and a wireless charge coil 16, where the wireless charge coil 16 and the battery 15 are placed in the cavity of the input module 10, and the battery 15 is electrically connected to the wireless charge coil 16 by using the circuit board 14.

The wireless charge coil 16 may be configured in an area close to an inner wall of the sphere of the input module 10, so that it is convenient to sense an external charging device, so as to charge in a wireless manner.

The battery 15 may be disposed on one end of the input module 10 that is close to the fixing module 20.

Because the battery 15 is relatively heavy, disposing the battery at the bottom of the sphere that is close to the fixing module 20 can improve stability of the input device significantly.

Optionally, the sphere of the input module 10 is made of a translucent material or a transparent material, and an indicator 17 is disposed in the sphere or on the surface of the sphere of the input module 10, configured to prompt the user when the signal detection unit 11 detects a signal or the battery 15 is charged or discharged.

When the indicator 17 is configured in the sphere of the input module 10, because the input module 10 is made of a translucent material or a transparent material, the user can still acquire corresponding indication information by means of indication of the indicator 17. When the indicator 17 is disposed on the surface of the sphere of the input module 10, it is required to ensure that the indicator 17 does not protrude from the surface of the sphere, so as to protect the indicator 17.

The indicator 17 may specifically indicate an operation action performed by the user on the input device when the user performs the preset operation on the input device, for example, when the input device is squeezed, the indicator turns red, when the input device is twisted, the indicator turns yellow, and when the input device is bent or flipped, the indicator turns green. Certainly, the indicator 17 may also specifically indicate whether a signal input by the user is detected, so that the user learns whether an operation works, for example, when the input module 10 is slightly squeezed, a corresponding input signal may be not generated, and the indicator 17 is not lit; in this case, the user may squeeze harder, so that a sensor senses the action of the user and generates a corresponding input signal; at this time, the indicator 17 may be lit. The indicator 17 may further specifically indicate charge and discharge states of the battery 15, for example, when the battery is charged, the indicator turns yellow, when the battery is fully charged, the indicator turns green, and when the battery 15 runs out, the indicator turns red to prompt the user to charge as soon as possible.

It should be noted that, the above merely describes some common scenarios and application manners. A function of the indicator 17 may be defined by the user according to specific requirements, which is not limited in the present disclosure.

In this embodiment, a user may perform input by performing various operations on an input device, various sensors in a signal detection unit 11 sense the operations and then generate corresponding input signals, and a signal output unit 12 outputs the signals to an external terminal; moreover, the signal output unit 12 and the terminal may communicate in wireless communication manner, and a battery 15 of the input device may be charged in a wireless manner, so that an input manner of the entire input device is innovative and convenient. The entire device transmits a signal in a wireless manner and is charged in a wireless manner, so that it is convenient to carry and use the entire input device, thereby greatly improving convenience and efficiency of input in mobile office and entertainment of the user.

Figure 4:
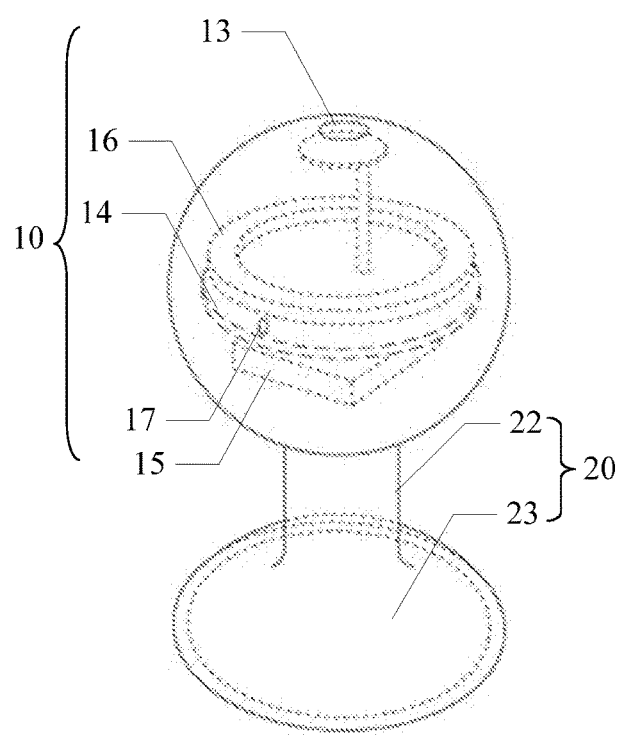
FIG. 4 is a schematic diagram of still another input device according to an embodiment of the present disclosure.

Refer to FIG. 4, which is a schematic diagram of still another input device according to an embodiment of the present disclosure. Different from the input device shown in FIG. 3, in this embodiment, an input module 10 is connected to a connecting portion 22 of a fixing module 20.

As shown in FIG. 4, the input module 10 also may include a signal detection unit 11 (not shown in the figure) and a signal output unit 12 (not shown in the figure). Moreover, the signal detection unit 11 and the signal output unit 12 are integrated on a circuit board 14, and therefore are not separately shown in FIG. 4. The signal detection unit 11 and the signal output unit 12 are placed in a cavity after being electrically connected, the signal detection unit 11 is configured to generate a corresponding input signal according to a preset operation performed by a user on the input module 10, and the signal output unit 12 is connected to an external terminal and configured to output the input signal to the terminal.

The signal detection unit 11 includes an acceleration sensor and a gyro sensor, and may further include an electronic compass sensor and a barometric pressure detection sensor.

The signal output unit 12 includes a wireless transmission subunit, and the signal output unit 12 is connected to the terminal in a wireless manner.

The wireless transmission subunit transmits a signal by using a Bluetooth technology, a WiFi technology, or a Zegbee technology.

Certainly, a data transmission interface may be further disposed on the fixing module 20, and the signal output unit 12 is connected to the terminal in a wired manner by using the data transmission interface.

The input module 10 further includes a button 13, where the button 13 is electrically connected to the signal detection module, and the button 13 is disposed on the surface of the sphere of the input module 10 and is not in contact with the fixing module 20.

The button 13 is a physical button 13 or a capacitive button 13.

The input module 10 further includes the circuit board 14, where the circuit board 14 is placed in the cavity of the input module 10, and the signal detection module and the signal output module are placed on the circuit board 14.

The input device further includes a battery 15 and a wireless charge coil 16, where the wireless charge coil 16 and the battery 15 are placed in the cavity of the input module 10, and the battery 15 is electrically connected to the wireless charge coil 16 by using the circuit board 14.

Certainly, it may also be that the input device further includes a battery 15, a charging interface is further disposed on the fixing module 20, and the battery 15 is placed in the cavity of the input module 10 and is electrically connected to the charging interface by using the circuit board 14.

The battery 15 may be disposed on one end of the input module 10 that is close to the fixing module 20.

The sphere of the input module 10 is made of a translucent material or a transparent material, and an indicator 17 is disposed in the sphere or on the surface of the sphere of the input module 10, configured to prompt the user when the signal detection unit 11 detects a signal or the battery 15 is charged or discharged.

The following describes the preset operation of the user and a corresponding effect on a display interface of the terminal with reference to FIG. 5a to FIG. 14. It should be noted that, diagrams of effects on the display interface of the terminal that are described herein are merely for describing a mapping relationship between the input device and terminal display and a control process, and are not intended to limit an actual effect displayed by the terminal, and a diagram of an actual effect displayed by the terminal needs to be displayed according to an application run by the terminal, a specific object to which the input device is currently mapped, and a scenario.

Figure 5A:
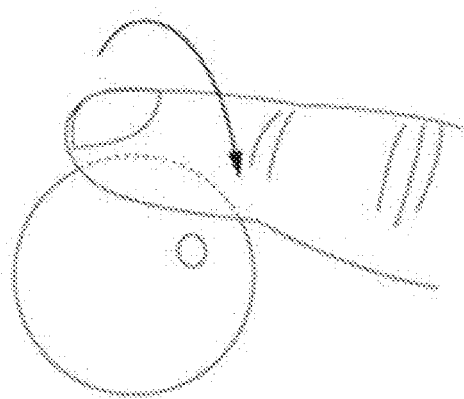
FIG. 5a is a schematic diagram of a first operation of performing a preset operation on an input device according to an embodiment of the present disclosure.
Figure 5B:
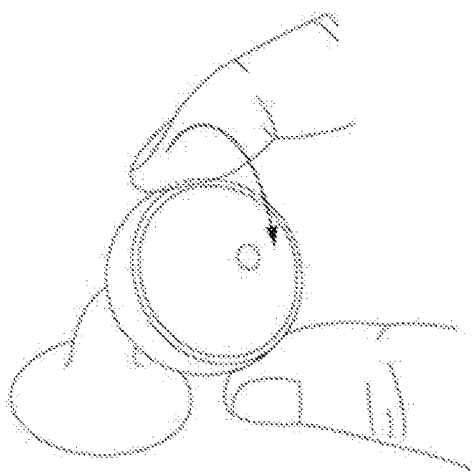
FIG. 5b is a schematic diagram of a second operation of performing a preset operation on an input device according to an embodiment of the present disclosure.
Figure 6:
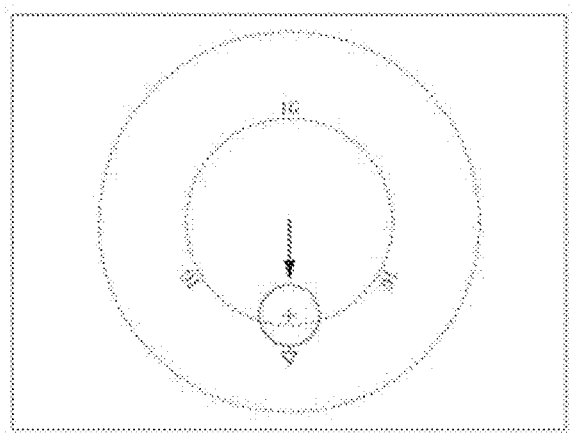
FIG. 6 is a diagram of a first effect corresponding to FIG. 5a and FIG. 5b on a display interface of a terminal.

Referring to FIG. 5a, FIG. 5b, and FIG. 6, FIG. 5a is a schematic diagram of a first operation of performing a preset operation on an input device according to an embodiment of the present disclosure; FIG. 5b is a schematic diagram of a second operation of performing a preset operation on an input device according to an embodiment of the present disclosure; and FIG. 6 is a diagram of a first effect corresponding to FIG. 5a and FIG. 5b on a display interface of a terminal.

As shown in FIG. 5a, the user may roll the spherical input module at a first speed in any direction. As shown in FIG. 5b, the user may also bend the connecting portion 22 at a first speed. In FIG. 5b, the user may directly stroke the accommodating portion 21 of the fixing module to implement the above operation; and when the input module and the fixing module are connected, the user may directly stroke the input module.

A diagram of an effect displayed on the display interface of the terminal is shown in FIG. 6. The solid line circle is an object to which the input device is mapped in an application of the terminal, a symbol "+" in the center of the solid line circle is center coordinates of the mapped object, a triangular symbol below the solid line circle is a forward direction of the mapped object, a solid line arrow represents a current motion direction of the mapped object, a dotted line circle with a small diameter is a range indication circle of a 1G acceleration, and a dotted line circle with a large diameter is a range indication circle of a preset acceleration, where the preset acceleration is greater than the 1G acceleration. As shown in FIG. 6, if the user rolls the input module backwards or strokes the accommodating portion 21 of the fixing module backwards at the first speed, and in this case, an acceleration of the motion of the input device is not greater than 1G, correspondingly, on the display interface of the terminal, the mapped object moves backwards in the forward direction, and does not get out of the range indication circle of the 1G acceleration.

Figure 7A:
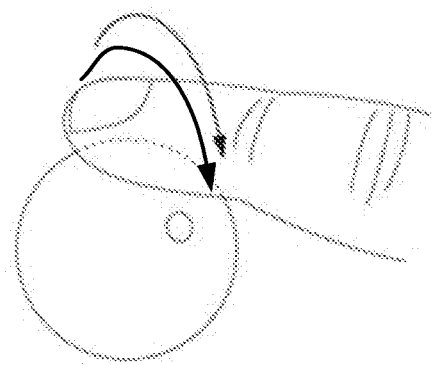
FIG. 7a is a schematic diagram of a third operation of performing a preset operation on an input device according to an embodiment of the present disclosure.
Figure 7B:
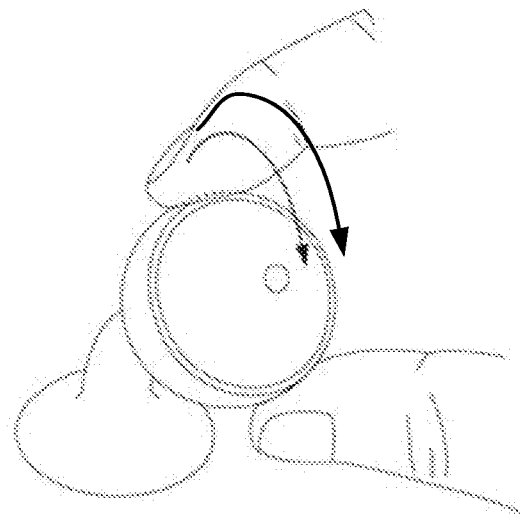
FIG. 7b is a schematic diagram of a fourth operation of performing a preset operation on an input device according to an embodiment of the present disclosure.
Figure 8:
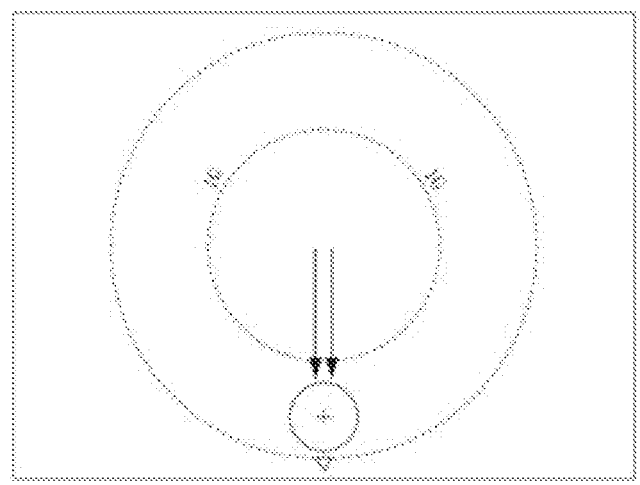
FIG. 8 is a diagram of a second effect corresponding to FIG. 7a and FIG. 7b on a display interface of a terminal.

Referring to FIG. 7a, FIG. 7b, and FIG. 8, FIG. 7a is a schematic diagram of a third operation of performing a preset operation on an input device according to an embodiment of the present disclosure; FIG. 7b is a schematic diagram of a fourth operation of performing a preset operation on an input device according to an embodiment of the present disclosure; and FIG. 8 is a diagram of a second effect corresponding to FIG. 7a and FIG. 7b on a display interface of a terminal.

As shown in FIG. 7a, the user may roll the spherical input module at a second speed in any direction. As shown in FIG. 7b, the user may also bend the connecting portion 22 at a second speed. In FIG. 7b, the user may directly stroke the accommodating portion 21 of the fixing module to implement the above operation; and when the input module and the fixing module are connected, the user may directly stroke the input module.

A diagram of an effect displayed on the display interface of the terminal is shown in FIG. 8. When the user rolls the input module backwards or strokes the accommodating portion 21 of the fixing module backwards at the second speed, and in this case, an acceleration of the motion of the input device is greater than 1G, correspondingly, on the display interface of the terminal, the mapped object moves backwards in a forward direction, and gets out of a range indication circle of the 1G acceleration.

Figure 9A:
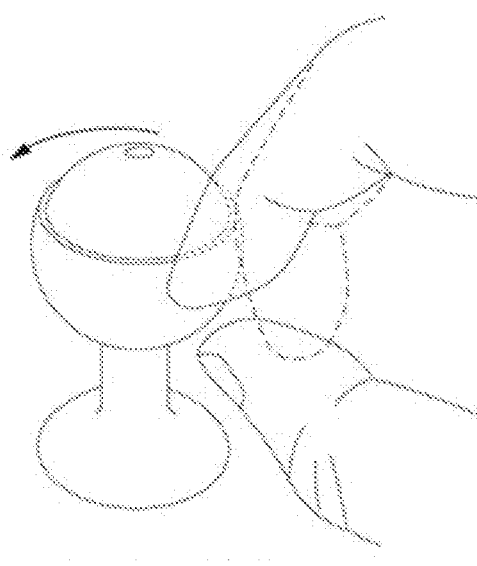
FIG. 9a is a schematic diagram of a fifth operation of performing a preset operation on an input device according to an embodiment of the present disclosure.
Figure 9B:
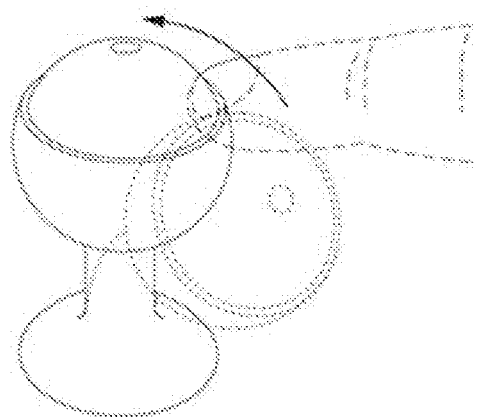
FIG. 9b is a schematic diagram of a sixth operation of performing a preset operation on an input device according to an embodiment of the present disclosure.
Figure 10:
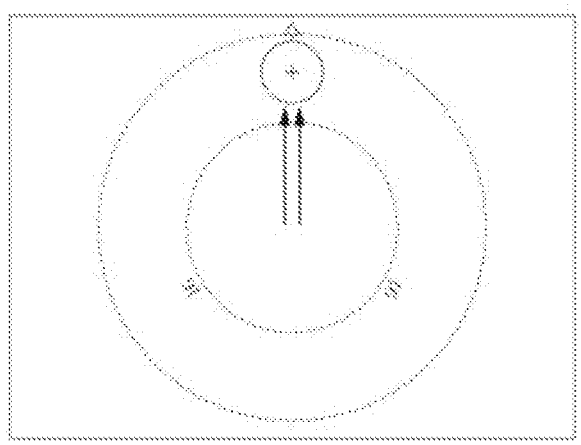
FIG. 10 is a diagram of a third effect corresponding to FIG. 9a and FIG. 9b on a display interface of a terminal.

Referring to FIG. 9a, FIG. 9b, and FIG. 10, FIG. 9a is a schematic diagram of a fifth operation of performing a preset operation on an input device according to an embodiment of the present disclosure; FIG. 9b is a schematic diagram of a sixth operation of performing a preset operation on an input device according to an embodiment of the present disclosure; and FIG. 10 is a diagram of a third effect corresponding to FIG. 9a and FIG. 9b on a display interface of a terminal.

As shown in FIG. 9a, the user flips the accommodating portion 21 of the fixing module 21 forwards, so as to make an acceleration of the motion of the input device greater than 1G; or as shown in FIG. 9b, the user strokes the accommodating portion 21 backwards and then releases the accommodating portion 21, so that the accommodating portion 21 drives the input module to bound forwards and an acceleration of the bounce is greater than 1G.

An effect displayed on the display interface of the terminal is shown in FIG. 10. When the user flips the accommodating portion 21 of the fixing module forwards at the second speed, or strokes the accommodating portion 21 backwards at the second speed and then releases the accommodating portion 21, and in this case, an acceleration of the motion of the input device is greater than 1G, correspondingly, on the display interface of the terminal, the mapped object moves forwards in a forward direction, and gets out of a range indication circle of the 1G acceleration.

Figure 11:
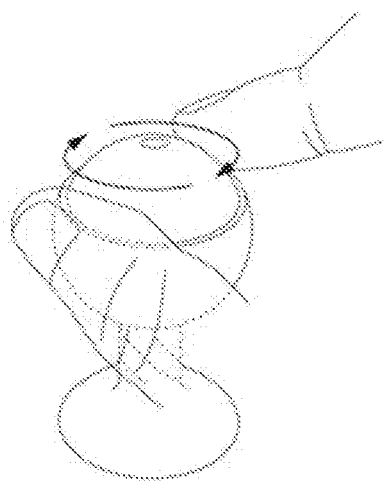
FIG. 11 is a schematic diagram of a seventh operation of performing a preset operation on an input device according to an embodiment of the present disclosure.
Figure 12:
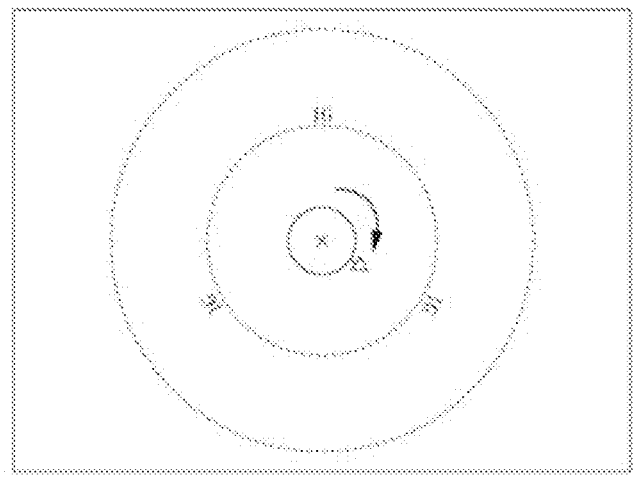
FIG. 12 is a diagram of a fourth effect corresponding to FIG. 11 on a display interface of a terminal.

Referring to FIG. 11 and FIG. 12, FIG. 11 is a schematic diagram of a seventh operation of performing a preset operation on an input device according to an embodiment of the present disclosure; and FIG. 12 is a diagram of a fourth effect corresponding to FIG. 11 on a display interface of a terminal.

As shown in FIG. 11, the user rotates the accommodating portion 21 of the fixing module clockwise, and certainly, may also rotate the spherical input module clockwise. For the input device in which the input module and the fixing module are connected, the user may directly rotate the spherical input module clockwise.

An effect displayed on the display interface of the terminal is shown in FIG. 12. When the user rotates the accommodating portion 21 of the fixing module clockwise, correspondingly, on the display interface of the terminal, center coordinates of the mapped object remain unchanged, and the mapped object rotates clockwise. A specific rotation angle may be obtained by mapping or converting a rotation angle of the input device.

Figure 13:
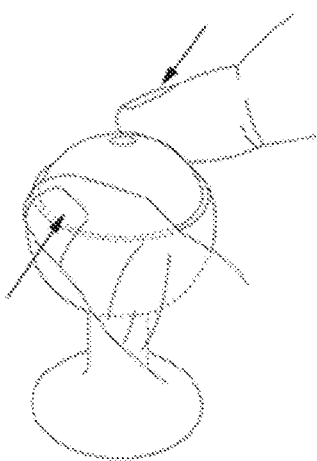
FIG. 13 is a schematic diagram of an eighth operation of performing a preset operation on an input device according to an embodiment of the present disclosure.
Figure 14:
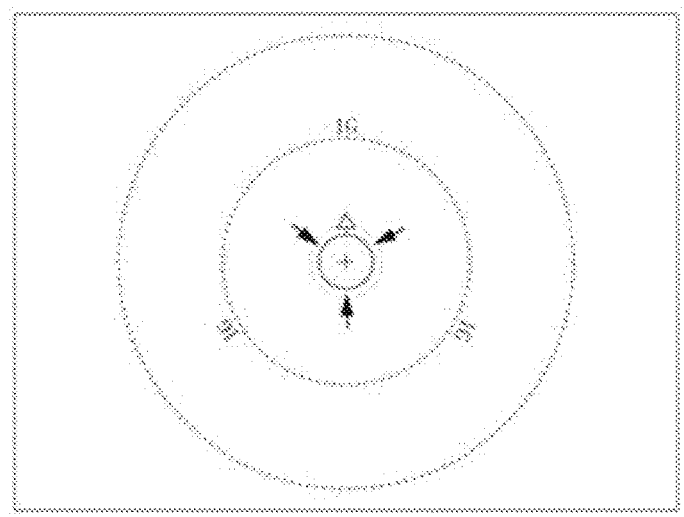
FIG. 14 is a diagram of a fourth effect corresponding to FIG. 13 on a display interface of a terminal.

Referring to FIG. 13 and FIG. 14, FIG. 13 is a schematic diagram of an eighth operation of performing a preset operation on an input device according to an embodiment of the present disclosure; and FIG. 14 is a diagram of a fourth effect corresponding to FIG. 13 on a display interface of a terminal.

As shown in FIG. 13, the user squeezes the accommodating portion 21 of the fixing module or the spherical input module inwards.

An effect displayed on the display interface of the terminal is shown in FIG. 14. When the user squeezes the accommodating portion 21 of the fixing module or the spherical input module inwards, correspondingly, on the display interface of the terminal, center coordinates of the mapped object remain unchanged, and the volume of the mapped object decreases.

It should be noted that, a mapping relationship between the preset operation performed by the user on the input device and control on the mapped object by the terminal may be preset by a vendor or defined by the user, which is not limited in the present disclosure.

Figure 15:
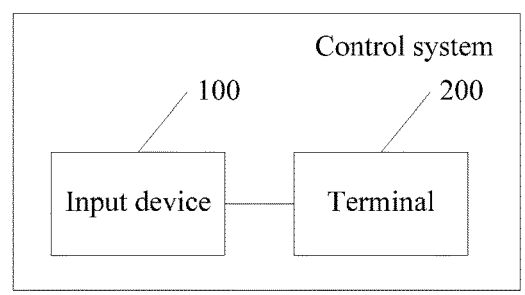
FIG. 15 is a schematic diagram of a control system according to an embodiment of the present disclosure.

Refer to FIG. 15, which is a schematic diagram of a control system according to an embodiment of the present disclosure. In this embodiment, the control system includes an input device 100 according to any one of the embodiments of the input device according to the present disclosure, and a terminal 200, configured to receive an input signal sent by the input device 100, and control, according to the input signal, an action of an object to which the input device 100 is currently mapped.

Specifically, the terminal receives various input signals sent by the input device, such as a geomagnetic data signal, an acceleration data signal, a gyro data signal, a barometric data signal, or a signal of a button 13, and may perform, according to an existing function, direction alignment, and position mapping, or displacement mapping on an object to which the input device is mapped in an application of the terminal.

For example, the terminal obtains geomagnetic data of the input device by using an electronic compass sensor in the input device, and may obtain a direction of the input device in combination with geomagnetic data of the terminal; an acceleration and angular velocity of the input device are obtained by using an acceleration sensor and a gyro sensor in the input device, and an offset direction and angle of the input device in motion may be calculated; moreover, by means of a current geomagnetic direction and the obtained direction of the input device, a twisted angle of the input device may further be obtained by calculation; and then, in combination with the size of a display screen of the terminal, information such as an actual displacement and twisted angle of the input device is mapped to the display interface of the terminal by using a preset mapping relationship.

In this way, the input device controls the mapped object in the application of the terminal in an entirely new manner.

A signal detection unit and a signal output unit are accommodated in a cavity of a spherical input module, the signal detection unit generates a corresponding input signal according to a preset operation performed by a user on the spherical input module, and last, the signal output unit outputs the signal to an external terminal, thereby improving convenience and efficiency of input of the user. Moreover, the input device can be fixed on a preset flat surface by using a fixing module. The entire input device is convenient to carry and use.

A person of ordinary skill in the art may understand that all or some of the processes of the foregoing embodiment methods may be implemented by a computer program instructing relevant hardware. The program may be stored in a computer readable storage medium. When the program is executed, the processes of the embodiments of the foregoing methods may be included. The storage medium may be a magnetic disk, an optical disc, a read-only memory (ROM), a random access memory (RAM), or the like.

The above descriptions are merely preferred embodiments of the present disclosure, and certainly, are not intended to limit the claim scope of the present disclosure. Any equivalent change made according to the claims of the present disclosure shall fall within the scope of the present disclosure.

What is claimed is:

1. An input device, comprising:
   an input module and a fixing module matching the input module, the input module being a sphere having a cavity, the input module comprising a signal detection unit and a signal output unit, the signal detection unit and the signal output unit being placed in the cavity after being electrically connected, the signal detection unit being configured to generate a corresponding input signal according to a preset operation performed by a user on the input module, and the signal output unit being connected to an external terminal and configured to output the input signal to the terminal; and
   the fixing module being configured to fix the input device on a preset flat surface,
   wherein the fixing module comprises an accommodating portion, a connecting portion, and a fixing portion, wherein the accommodating portion is in the shape of a cup, and configured to accommodate the input module to make the input module roll inside the accommodating portion; the connecting portion is separately connected to the accommodating portion and the fixing portion; and the fixing portion is a suction cup; the input module and the connecting portion are made of an elastic material; and the preset operation comprises any one or more of the following:
   rolling the input module at a first speed in any direction, or bending the connecting portion at a first speed in any direction;
   rolling the input module at a second speed in any direction, or bending the connecting portion at a second speed in any direction;
   flipping the input module in any direction, so as to make a speed of the input module reach the second speed, or bending the connecting portion in any direction and then releasing the input module, so as to make a speed of the input module reach the second speed;
   twisting the input module in any direction; and
   squeezing the input module.

2. A control system, comprising:
   an input device according to claim 1; and
   a terminal, configured to map the input device to a to-be-controlled object in an application of the terminal, receive an input signal sent by the input device, and control, according to the input signal, an action of the object to which the input device is currently mapped.

3. An input device, comprising:
   an input component and a fixing component matching the input component, the input component being a sphere having a cavity, the input component comprising a signal detection unit and a signal output unit, the signal detection unit and the signal output unit being placed in the cavity after being electrically connected, the signal detection unit being configured to generate a corresponding input signal according to a preset operation performed by a user on the input component, and the signal output unit being connected to an external terminal and configured to output the input signal to the terminal; and
   the fixing component fixing the input device on a preset flat surface, wherein the signal detection unit comprises an acceleration sensor and a gyro sensor, wherein the acceleration sensor is configured to sense a linear acceleration of the input component when the user performs the preset operation on the input component, and the signal output unit is configured to output the linear acceleration of the input component to the terminal, so that the terminal controls an acceleration of a mapped object in an application of the terminal according to the linear acceleration of the input component; and the gyro sensor is configured to sense an angular velocity of the input component when the user performs the preset operation on the input component, and the signal output unit is further configured to output the angular velocity of the input component to the terminal, so that the terminal controls the angular velocity of the mapped object in the application of the terminal according to the linear acceleration of the input component;

wherein the signal detection unit further comprises a barometric pressure detection sensor, wherein the barometric pressure detection sensor is configured to generate a corresponding squeezing signal by sensing a barometric change in the input component, and the signal output unit is further configured to output the squeezing signal to the terminal, so that the terminal performs control to decrease the volume of the mapped object in the application of the terminal.

4. The input device according to claim 3, wherein the signal detection unit further comprises an electronic compass sensor, wherein the electronic compass sensor is configured to determine a position and direction of the input component according to earth induction, and the signal output unit is further configured to output the position and direction of the input component to the terminal, so that the terminal determines a position and direction of the mapped object in the application of the terminal according to the position and direction of the input component.

5. The input device according to claim 3, wherein a data transmission interface is further disposed on the fixing component, and the signal output unit is connected to the terminal in a wired manner by using the data transmission interface.

6. The input device according to claim 3, wherein the signal output unit comprises a wireless transmission subunit, and the signal output unit is connected to the terminal in a wireless manner.

7. The input device according to claim 6, wherein the wireless transmission subunit transmits a signal by using a Bluetooth technology, a wireless fidelity (WiFi) technology, or a Zegbee technology.

8. The input device according to claim 7, wherein the input component further comprises a button, wherein the button is electrically connected to the signal detection component, and the button is disposed on the surface of the sphere of the input component and is not in contact with the fixing component.

9. The input device according to claim 8, wherein the button is a physical button or a capacitive button.

10. The input device according to claim 9, wherein the input component further comprises a circuit board, wherein the circuit board is placed in the cavity of the input component, and the signal detection component and the signal output component are placed on the circuit board.

11. The input device according to claim 10, wherein the input device further comprises a battery, a charging interface is further disposed on the fixing component, and the battery is placed in the cavity of the input component and is electrically connected to the charging interface by using the circuit board.

12. The input device according to claim 11, wherein the battery is disposed on one end of the input component that is close to the fixing component.

13. The input device according to claim 12, wherein the sphere of the input component is made of a translucent material or a transparent material, and an indicator is disposed in the sphere or on the surface of the sphere of the input component, configured to prompt the user when the signal detection unit detects a signal or the battery is charged or discharged.

14. The input device according to claim 10, wherein the input device further comprises a battery and a wireless charge coil, wherein the wireless charge coil and the battery are placed in the cavity of the input component, and the battery is electrically connected to the wireless charge coil by using the circuit board.

* * * * *